(12) United States Patent
Taniguchi et al.

(10) Patent No.: US 8,025,202 B2
(45) Date of Patent: Sep. 27, 2011

(54) METHOD FOR MANUFACTURING SEALED BATTERY

(75) Inventors: Yasutomo Taniguchi, Moriguchi (JP);
Yasuhiro Yamauchi, Moriguchi (JP);
Naoya Nakanishi, Moriguchi (JP);
Toshiyuki Nohma, Moriguchi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 67 days.

(21) Appl. No.: 11/902,688

(22) Filed: Sep. 25, 2007

(65) Prior Publication Data
US 2008/0078815 A1    Apr. 3, 2008

(30) Foreign Application Priority Data

Sep. 28, 2006 (JP) ................................. 2006-265127

(51) Int. Cl.
*B23K 1/06* (2006.01)
(52) U.S. Cl. .................................................. 228/110.1
(58) Field of Classification Search ............. 228/110.01; 29/623.1, 623.2, 623.4; 429/160, 161, 211
See application file for complete search history.

(56) References Cited

U.S. PATENT DOCUMENTS

| | | | | |
|---|---|---|---|---|
| 4,948,939 | A * | 8/1990 | Moon ...................... | 219/121.64 |
| 6,713,211 | B2 * | 3/2004 | Morishita et al. ............... | 429/94 |
| 2005/0058908 | A1 | 3/2005 | Imachi et al. | |
| 2005/0214642 | A1 * | 9/2005 | Kim et al. ..................... | 429/211 |
| 2005/0221178 | A1 * | 10/2005 | Kim ............................... | 429/211 |
| 2006/0040176 | A1 * | 2/2006 | Ling et al. ..................... | 429/160 |
| 2006/0115722 | A1 * | 6/2006 | Kim ............................... | 429/161 |

FOREIGN PATENT DOCUMENTS

| | | |
|---|---|---|
| CN | 1599117 A | 3/2005 |
| CN | 1684291 A | 10/2005 |
| JP | 7-326336 A | 12/1995 |
| JP | 2001-38475 A | 2/2001 |

OTHER PUBLICATIONS

English translation of Fujiwara et al., JP 07-326336, "Secondary Battery".*
Chinese Office Action dated Jun. 28, 2010, issued in corresponding Chinese Patent Application No. 200710141076.6.

* cited by examiner

*Primary Examiner* — Jessica L Ward
*Assistant Examiner* — Steven Ha
(74) *Attorney, Agent, or Firm* — Westerman, Hattori, Daniels & Adrian, LLP (57) ABSTRACT

A sealed battery includes an ultrasonic fusion process whereby layers of a positive electrode substrate exposed portion are ultrasonically fused to form a positive electrode fused portion at the positive electrode substrate exposed portion, and layers of a negative electrode substrate exposed portion are ultrasonically fused to form a negative electrode fused portion at the negative electrode substrate exposed portion; and an electrode body formation process whereby a high-energy beam is directed at the positive electrode fused portion to weld a positive electrode collector to the positive electrode fused portion, and a high-energy beam is directed at the negative electrode fused portion to weld a negative electrode collector to the negative electrode fused portion, thus forming an electrode body in which a positive electrode collector is welded to one end of the electrode group and a negative electrode collector is welded to the other end.

4 Claims, 5 Drawing Sheets

METHOD FOR MANUFACTURING SEALED BATTERY

BACKGROUND

1. Technical Field

The present invention relates to a sealed battery such as a lithium ion battery or alkali battery, and more particularly to a method for manufacturing a sealed battery in which a metal case houses an electrode group that has a portion with the positive electrode substrates exposed formed at one end, and a portion with the negative electrode substrates exposed formed at the other end.

2. Related Art

In recent times, lithium secondary batteries with high energy density (Wh/kg) have been developed as power sources used in portable electronic and communication equipment such as mobile telephones, notebook personal computers and small-size video cameras, and as power sources for hybrid vehicles (HEVs) and electric vehicles (EVs). Among such batteries, particular attention is being focused on sealed batteries, which have high volumetric energy density (Wh/l).

Batteries of this kind, an example of which is disclosed in JP-A-7-326336, are manufactured in the following manner. First, positive electrode mixture containing positive electrode active material is applied to positive electrode substrates (normally aluminum foil) to make positive electrode plates, and negative electrode mixture containing negative electrode active material is applied to negative electrode substrates (normally copper foil) to make negative electrode plates. Then the positive electrode plates and negative electrode plates obtained are stacked alternately with separators interposed, forming a flattened electrode group, which is put into a flattened prismatic case, into which nonaqueous electrolyte is poured, resulting in a prismatic battery.

In the flattened electrode group manufactured in the manner described above, as shown in FIG. 4 for example, at one end there are formed positive electrode substrate exposed portions (portions where positive electrode mixture was not applied) 51a extending from positive electrode plates 51, and at the other end there are formed negative electrode substrate exposed portions (portions where negative electrode mixture was not applied) 52a extending from negative electrode plates 52. Subsequently, a positive electrode collecting lead (positive electrode collector) 53 is deposed at the bottom of the positive electrode substrate exposed portions 51a, and an ultrasonic welding device 60 composed of an ultrasonic horn 61 and an ultrasonic transmitter 62 is made ready. Then the ultrasonic horn 61 is pressed against the top of the positive electrode substrate exposed portions 51a, and by causing the ultrasonic transmitter 62 connected to the ultrasonic horn 61 to ultrasonically vibrate, the positive electrode collecting lead 53 is welded to the positive electrode substrate exposed portions 51a.

Figure 4:
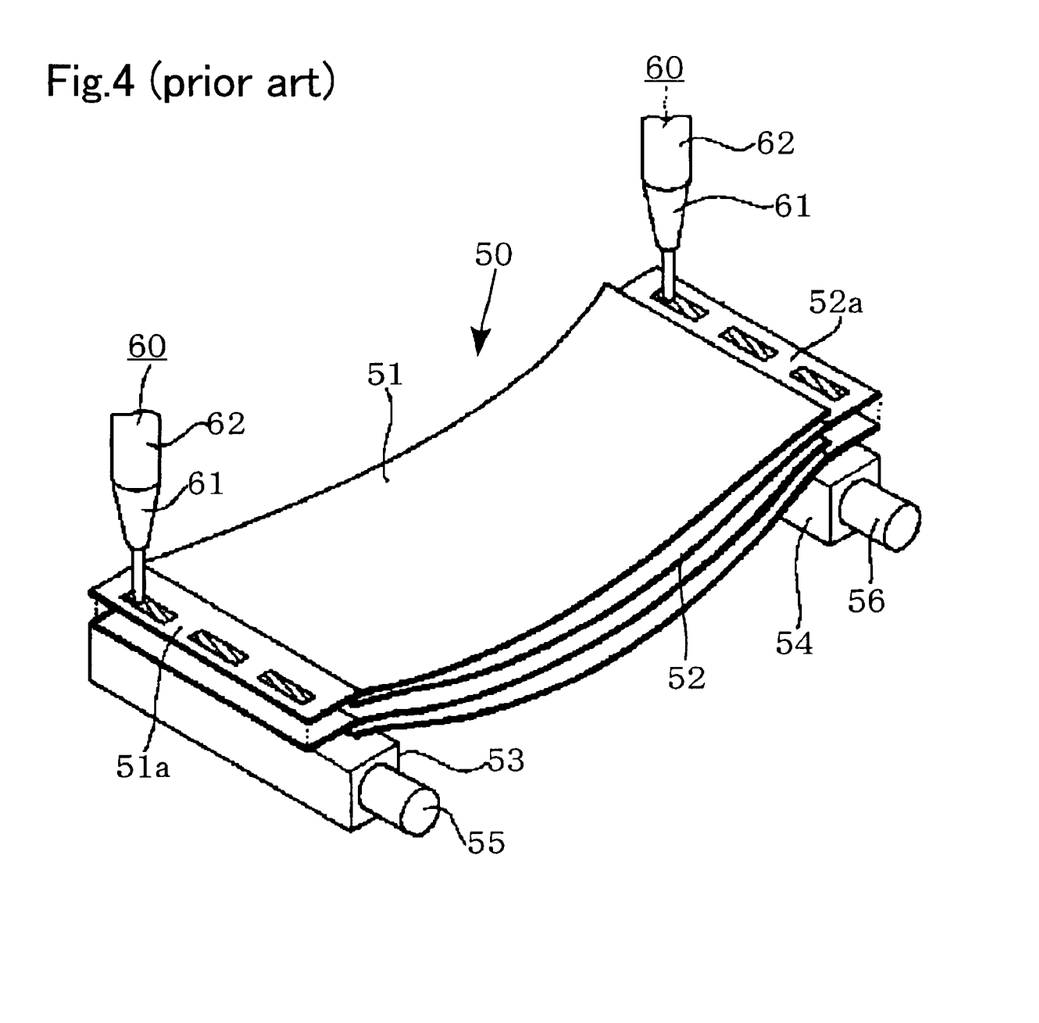
FIG. 4 is a perspective view illustrating schematically the state where collecting leads (collectors) are about to be ultrasonically welded to a flattened electrode group in an example of the related art.

Also, a negative electrode collecting lead (negative electrode collector) 54 is deposed at the bottom of the negative electrode substrate exposed portions 52a, and the ultrasonic horn 61 is pressed against the top of the negative electrode substrate exposed portions 52a, and by causing the ultrasonic transmitter 62 connected to the ultrasonic horn 61 to ultrasonically vibrate, the negative electrode collecting lead 54 is welded to the negative electrode substrate exposed portions 52a. In this way, an electrode body 50 is obtained in which the positive electrode collecting lead 53 and negative electrode collecting lead 54 are welded to the two ends of the flattened electrode group. Then the electrode body 50 thus obtained is put inside a flattened prismatic case, after which the positive lead 53 is welded to a positive terminal portion 55 of a sealing plate, and the negative lead 54 to a negative terminal portion 56 thereof. Next, the sealing plate is welded to the case's mouth, a particular electrolyte is poured through a pour hole formed in the sealing plate, and the pour hole is sealed. Thereupon, manufacture of the prismatic battery is complete.

However, in the ultrasonic joining of the positive electrode substrate exposed portions 61a to the positive electrode collecting lead (positive electrode collector) 53, or the ultrasonic joining of the negative electrode substrate exposed portions 52a to the negative electrode collecting lead (negative electrode collector) 54, it has been necessary, in order to join integrally the layers of each substrate exposed portion to the respective collecting lead, to deliver high outputs of ultrasonic energy according as the number of substrates stacked increases.

But when, in order to render the battery high-output, it has been attempted to increase the number of electrode plates (substrates) stacked, and at the same time to satisfy the joining conditions, there has been the problem that excessive stress is exerted on the join portions and surrounding areas, which fracture due to insufficient strength of the electrode plates (substrates) constituting the electrode body. Particularly in the case of a lithium ion secondary battery, which generally uses aluminum foil and copper foil for the substrates, it has been problematic to obtain a completely joined state without causing damage to the electrode plates (substrates), because such materials are problematic to join.

Figure 5A:
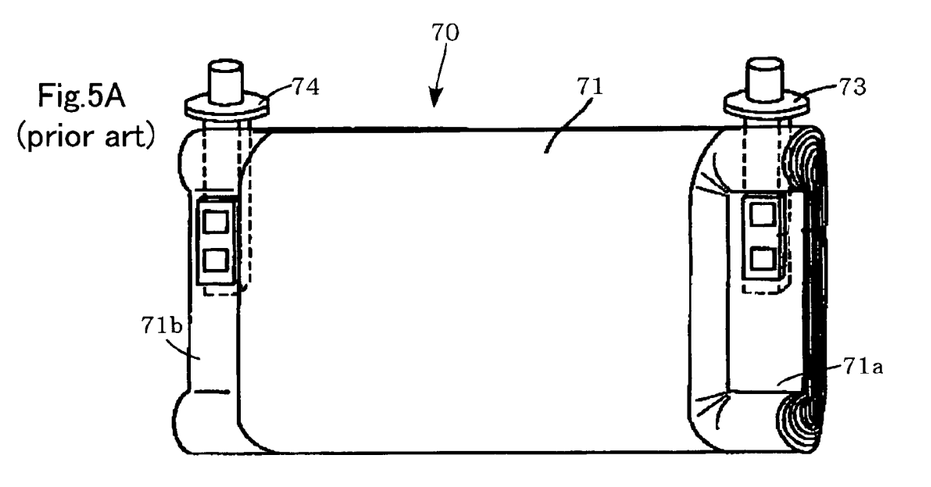
FIG. 5 is a perspective view illustrating schematically the state where collecting leads (collectors) have been ultrasonically welded to a flattened electrode group in another example of the related art.
Figure 5B:
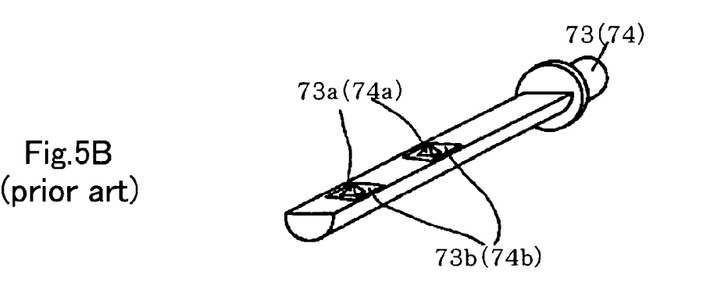

Accordingly, it was proposed in JP-A-2001-38475 to join the collecting leads to the stack integrally by providing projections in the collecting leads and applying the ultrasonic vibration with the projections superposed over the stack. As FIG. 5 shows, in the method of joining to the stack that was proposed in JP-A-2001-38475, ultrasonic vibration is applied to a stack 71 having, formed at one end, positive electrode substrate exposed portions (portions where positive electrode mixture was not applied) 71a extending from the positive electrode plates, and formed at the other end, negative electrode substrate exposed portions (portions where negative electrode mixture was not applied) 71b extending from the negative electrode plates, and to collecting leads 73, 74 that are superposed over the substrate exposed portions 71a, 71b of the stack 71, so as to fuse the layers of each substrate exposed portion 71a, 71b and join the collecting leads 73 and 74 to the substrate exposed portions 71a and 71b respectively of the stack 71.

Each collecting lead 73, 74 has a protrusion 73a, 74a that projects from the portion that is superposed over the stack 71, and the ultrasonic vibration is applied with the protrusions 73a, 74a pushed against the substrate exposed portions 71a, 71b of the stack 71. In this way, by providing protrusions 73a, 74a on the surfaces 73b, 74b of the collecting leads 73, 74 that join with the substrate exposed portions 71a, 71b of the stack 71, it is contrived to have the ultrasonic amplitude energy of the ultrasonic joining method locally absorbed and diffused, and thus to raise to a high level the efficiency of the ultrasonic joining process. As a result, heat emission, fractures and "bite-in" by the horn in the stack 71's joining portions and surrounding areas are curbed, so that the joining surfaces are rendered high-quality.

However even when, as proposed in JP-A-2001-38475, it has been contrived to have the ultrasonic amplitude energy locally absorbed and diffused by providing protrusions 73a, 74a on the surfaces 73b, 74b of the collecting leads 73, 74 that join with the substrate exposed portions 71a, 71b of the stack 71, there have occurred problems such as rupturing of the electrode plates (substrates) constituting the electrode body, since excessive stress is exerted on the joining portions and surrounding areas. A readily conceivable alternative to the ultrasonic joining method in this case is the laser welding method, which however requires the use of a laser welding machine of high output in order to laser-weld the stack and collecting leads simultaneously, and therefore has resulted in problems such as described below.

Specifically, there has been the problem that since the welding is high-output, it is problematic to shorten the duration (takt time) of the welding process, and therefore the equipment costs increase. There has also been the problem that because it is problematic to shorten the takt time with high output, thermal effects are exerted on the separator and other parts present in the proximity of the welds. Further, there is danger that when the high-output laser beam is shone, welding spatter will be liable to occur, and welding dust could adhere to the electrode body or the interior of the processing equipment, resulting in internal short-circuits or other troubles.

SUMMARY

An advantage of some aspects of the present invention is to provide a method for manufacturing sealed batteries which have low internal resistance and in which occurrence of internal short-circuits is prevented, whereby the required welding strength is obtained despite the energy for welding being reduced.

According to an aspect of the invention, a method for manufacturing a sealed battery in which a metal case houses an electrode group having a positive electrode substrate exposed portion formed at one end and a negative electrode substrate exposed portion formed at the other end, includes: an ultrasonic fusion process whereby the positive electrode substrate exposed portion layers are ultrasonically fused to form a positive electrode fused portion at the positive electrode substrate exposed portion, and the negative electrode substrate exposed portion layers are ultrasonically fused to form a negative electrode fused portion at the negative electrode substrate exposed portion and an electrode body formation process whereby a high-energy beam is directed at the positive electrode fused portion to weld a positive electrode collector to the positive electrode fused portion, and a high-energy beam is directed at the negative electrode fused portion to weld a negative electrode collector to the negative electrode fused portion, thus forming an electrode body in which a positive electrode collector is welded to one end of the electrode group and a negative electrode collector is welded to the other end.

To complete manufacture of the sealed battery, the electrode body thus formed is placed inside a metal case together with electrolyte, and sealed.

Thus, by ultrasonically fusing the substrate exposed portion layers in advance to form fused portions, it is possible, when the high-energy beam is shone so as to weld the collectors to the fused portions, to perform such welding with a small amount of energy, and hence the energy can be reduced. Since the fused portions are formed by means of ultrasound, ultrasonic energy is consumed in advance. But as such consumption of ultrasonic energy is less than the high-energy beam, the total welding energy can be reduced.

Because it is possible to do the welding with a low-output high-energy beam, it will be possible to shorten the duration (takt time) of the welding process, and hence the equipment costs can be reduced. Also, exertion of thermal effects on the separator and other parts present in the proximity of the welds can be prevented, and moreover no welding spatter will occur, so that the trouble of welding dust adhering to the electrode body or the processing equipment interior will not arise. As a result, a sealed battery of high quality and enhanced reliability can be provided.

When the positive electrode collector and the negative electrode collector each have a slit formed therein, and when the high-energy beam is directed along the longitudinal centerlines of these slits, there is no need to cause the positive and negative electrode collectors to melt by direct application of the high-energy beam. Thus, the positive electrode fused portion is made to fuse with the positive electrode collector, and the negative electrode fused portion with the negative electrode collector, by causing the positive electrode fused portion and negative electrode fused portion to melt. Hence, compared to the case where collectors without slits formed therein are used, the energy required for welding can be further reduced, permitting energy conservation to be achieved, and further reducing troubles due to thermal effects and welding dust. The high-energy beam is preferably a laser beam.

Thus as described above, the sealed battery manufacturing method of the present invention permits welding with a low-output high-energy beam, and therefore is able to provide sealed batteries of high quality and enhanced reliability.

BRIEF DESCRIPTION OF THE DRAWINGS

The invention is described with reference to the accompanying drawings, wherein like numbers reference like elements.

FIG. 1 presents perspective views illustrating schematically an electrode group of the present invention, FIG. 1A being a perspective view illustrating schematically a flattened electrode group constituted of a stack of positive electrode plates and negative electrode plates with interposed separators that is rolled into a flattened spiral shape, FIG. 1B being a perspective view illustrating schematically the state where an ultrasonic horn is pressed against one of the substrate exposed portions formed at both ends of the flattened electrode group shown in FIG. 1A, in order to form an ultrasonically fused portion, and FIG. 1C being a perspective view illustrating schematically the state where ultrasonically fused portions have been formed at the substrate exposed portions formed at both ends of the flattened electrode group.

FIG. 2 presents a side view illustrating schematically an electrode body of the present invention, FIG. 2A being a side view illustrating schematically the electrode body in which a positive electrode collector is welded to one end of the electrode group, a negative electrode collector is welded to the other end, and a sealing plate is welded over the top of the electrode group, FIG. 2B being a plan view illustrating schematically the positive electrode collector, and FIG. 2C being a plan view illustrating schematically the negative electrode collector.

DESCRIPTION OF EXEMPLARY EMBODIMENT

An exemplary embodiment of the invention will now be described with reference to FIGS. 1 to 3. It should be understood however that this embodiment is given by way of example only, and in no sense by way of limitation; it will be obvious to those skilled in the art that modifications may be practiced without departing from the purpose and intent of the invention.

Figure 1A:
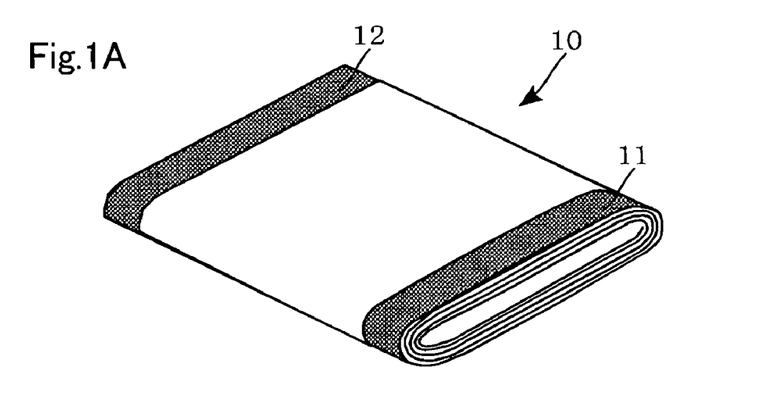
Figure 1B:
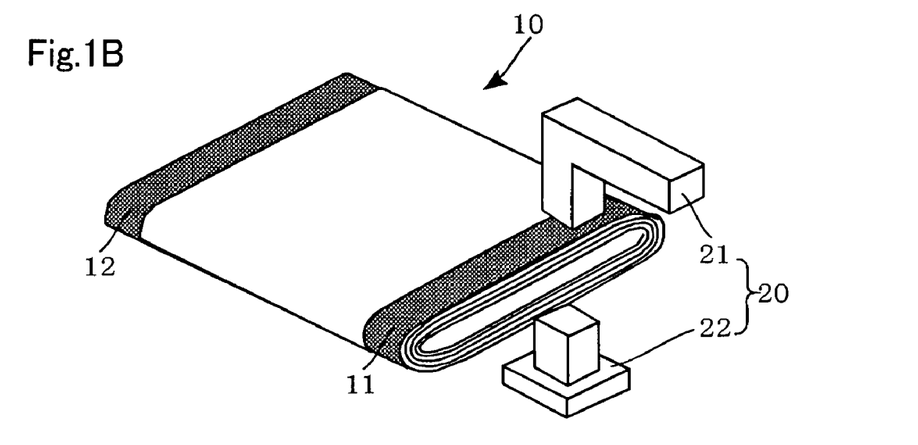
Figure 1C:
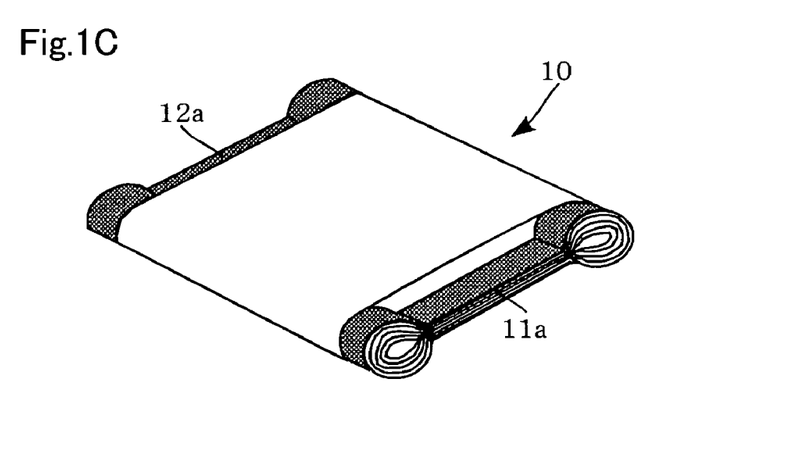

FIG. 1 presents perspective views illustrating schematically an electrode group of the present invention, FIG. 1A being a perspective view illustrating schematically a flattened electrode group constituted of a stack of positive electrode plates and negative electrode plates with separators interposed that is rolled into a flattened spiral shape, FIG. 1B being a perspective view illustrating schematically the state where an ultrasonic horn is pressed against one of the substrate exposed portions formed at both ends of the flattened electrode group shown in FIG. 1A, in order to form an ultrasonically fused portion, and FIG. 1C being a perspective view illustrating schematically the state where ultrasonically fused portions have been formed at the substrate exposed portions formed at both ends of the flattened electrode group.

Figures 2A, 2C:
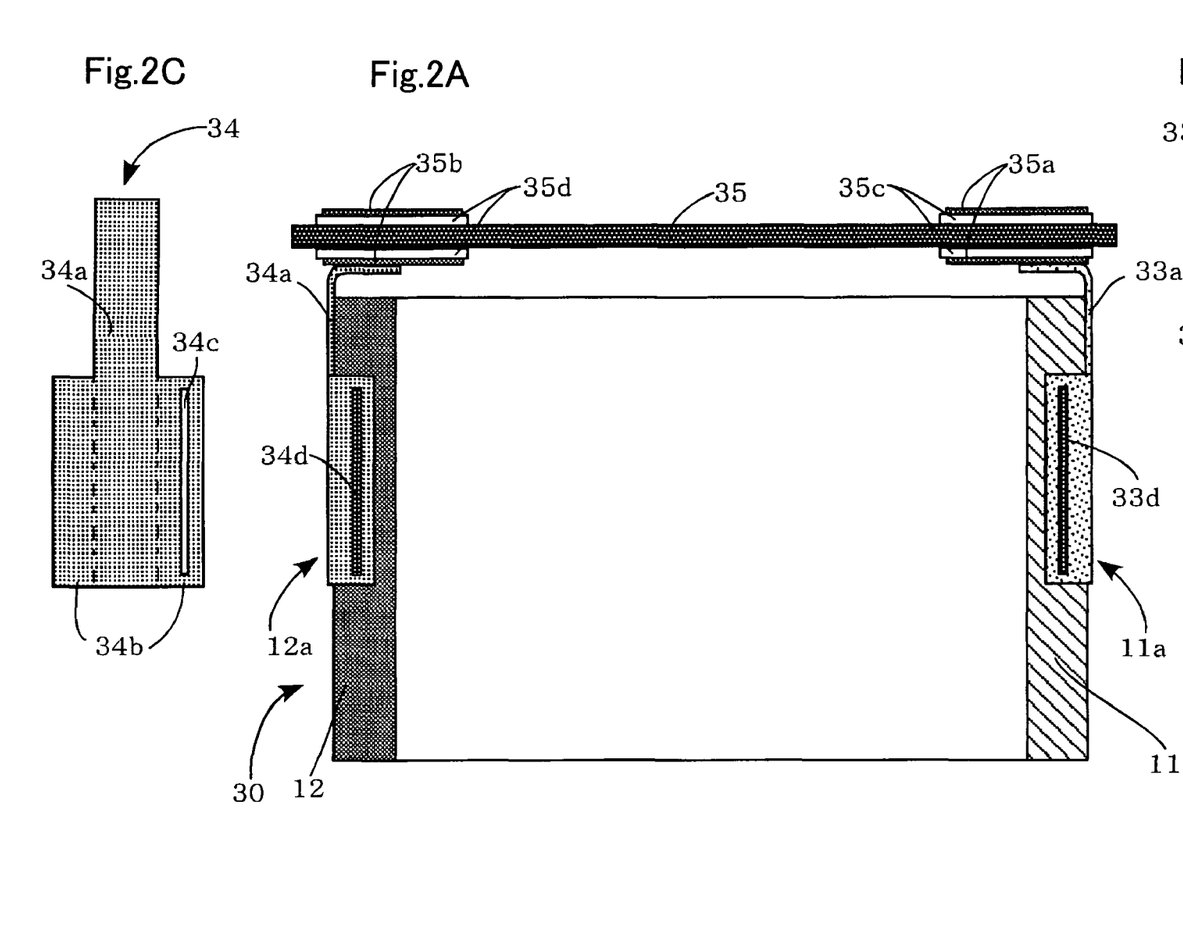
Figure 2B:
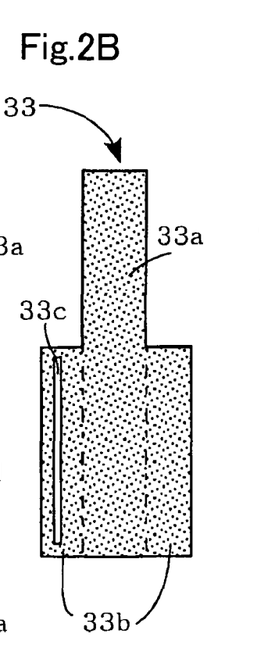
Figure 3:
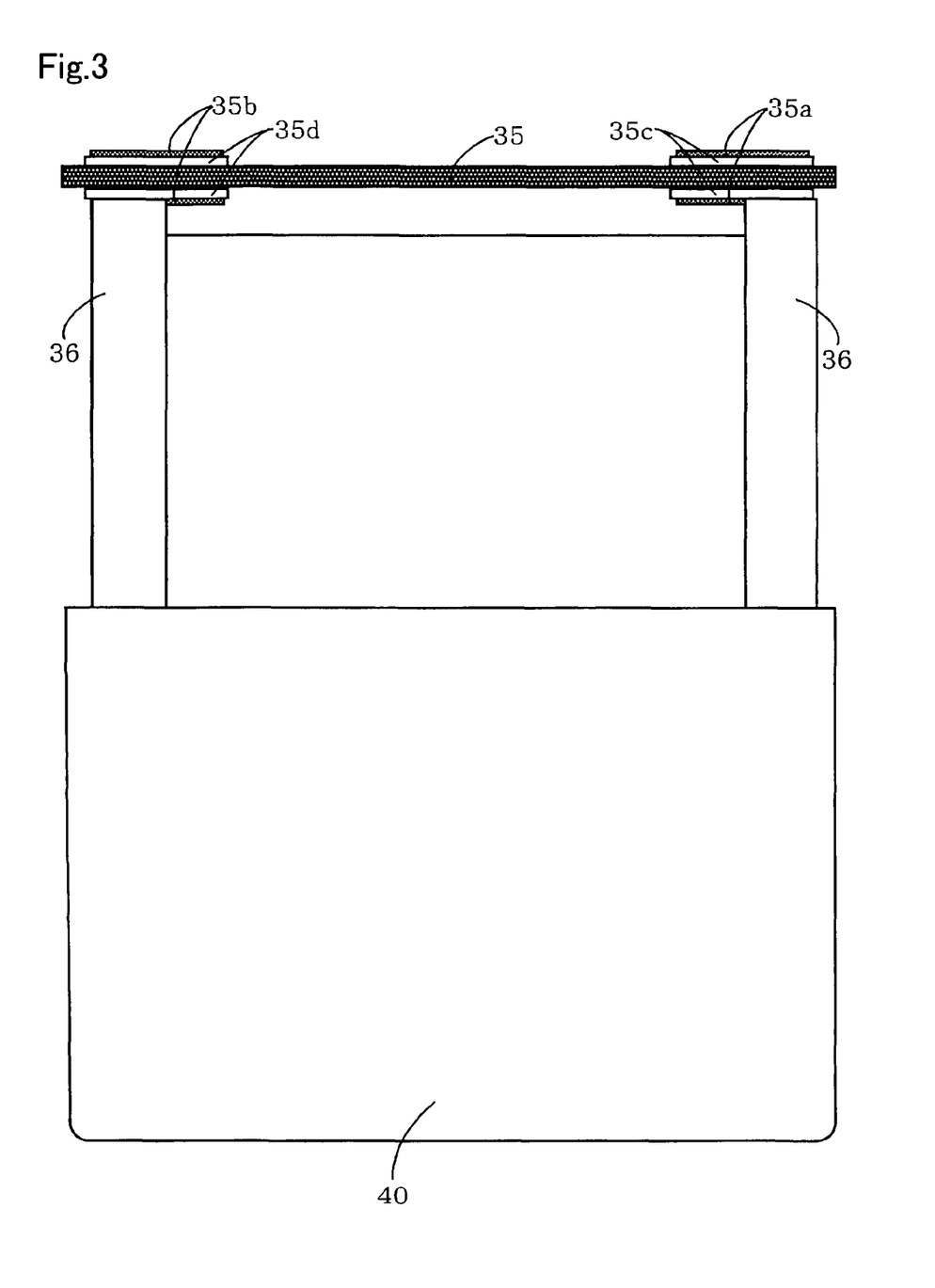
FIG. 3 is a side view illustrating schematically the state where the electrode body shown in FIG. 2A, with an insulating rim attached to the periphery thereof, is about to be inserted into the case.

FIG. 2 presents a side view illustrating schematically an electrode body of the present invention, FIG. 2A being a side view illustrating schematically the electrode body in which a positive electrode collector is welded to one end of the electrode group, a negative electrode collector is welded to the other end, and a sealing plate is welded over the top of the electrode group, FIG. 2B being a plan view illustrating schematically the positive electrode collector, and FIG. 2C being a plan view illustrating schematically the negative electrode collector. FIG. 3 is a side view illustrating schematically the state where the electrode body shown in FIG. 2A, with an insulating rim attached to the periphery thereof, is about to be inserted into the case.

1. Flattened Electrode Group

First of all, strip-form positive electrode substrates constituted of aluminum foil (of, say, 20 μm thickness) are prepared, and positive electrode slurry with positive electrode active material (lithium cobalt oxide ($LiCoO_2$) in the present instance) as main constituent is applied evenly to the positive electrode substrates to form positive electrode mixture layers. The positive electrode slurry is applied in such a manner that a positive electrode substrate exposed portion (portion where positive electrode slurry was not applied) 11 of a particular width (10 mm in the present instance) is formed at one of the long edges of each strip-form positive electrode substrate. After that, the substrates are passed through the inside of a drying machine to be dried and to remove the organic solvent that was needed to make the slurry. After drying, the substrates are rolled to a particular thickness by a roll press, to produce strip-form positive electrode plates. The strip-form positive electrode plates produced in this manner are then cut to a particular width, resulting in positive electrode plates provided with a strip-form positive electrode substrate exposed portion 11.

Similarly, strip-form negative electrode substrates constituted of copper foil (of, say, 12 μm thickness) are prepared, and negative electrode slurry with negative electrode active material (natural graphite in the present instance) as main constituent is applied evenly to the negative electrode substrates to form negative electrode mixture layers. The negative electrode slurry is applied in such a manner that a negative electrode substrate exposed portion (portion where negative electrode slurry was not applied) 12 of a particular width (8 mm in the present instance) is formed at one of the long edges of each strip-form negative electrode substrate. After that, the substrates are passed through the inside of a drying machine. After drying, the substrates are rolled to a particular thickness by a roll press, to produce strip-form negative electrode plates. The strip-form negative electrode plates produced in this manner are then cut to a particular width, resulting in negative electrode plates provided with a strip-form negative electrode substrate exposed portion 12.

Next, the positive electrode plates and negative electrode plates produced in the foregoing manner are made ready, and therebetween are interposed strip-form separators constituted of a microporous membrane (of thickness 0.030 mm and width 100 mm) with a polyethylene-polypropylene-polyethylene 3-layer structure, these items being moreover superposed over one another so that their widthwise centerlines coincide. After that, these items are rolled into a spiral form by a winder, and then the outermost periphery is fastened with tape, producing a spiral-form electrode group. This is then crushed so that the transverse cross-section thereof is a flattened shape, thus producing a flattened electrode group 10. At one end of the flattened electrode group 10 produced in this manner (the right end in the flattened electrode group 10 in FIG. 1A) there is formed the positive electrode substrate exposed portion 11, and at the other end (the left end in the flattened electrode group 10 in FIG. 1A) there is formed the negative electrode substrate exposed portion 12.

Next, an ultrasonic welding machine 20 composed of an ultrasonic horn 21, an anvil 22, and a control unit not shown in the drawings, is made ready. Also, an ultrasonic vibrator (not shown in the drawings) is deposed in a particular position on the ultrasonic horn 21, and by delivering particular high-frequency waves to this ultrasonic vibrator from the control unit (not shown in the drawings), the ultrasonic horn 21 is made to vibrate ultrasonically.

Next, as shown in FIG. 1B, the anvil 22 is deposed under a particular location in the strip-form positive electrode substrate exposed portion 11 formed on the flattened electrode group 10, and the ultrasonic horn 21 is deposed over that particular location in the positive electrode substrate exposed portion 11. Then a particular pressure is applied to the particular location in the positive electrode substrate exposed portion 11.

After that, high-frequency waves are delivered from the control unit (not shown in the drawings) to the ultrasonic vibrator, causing the ultrasonic horn 21 to vibrate ultrasonically. Thereby, the positive electrode substrates at the particular position in the positive electrode substrate exposed portion 11 are ultrasonically fused. Next, the positions of the ultrasonic horn 21 and anvil 22 are moved, and ultrasonic fusing is repeated in the same way as above. Thereby, an ultrasonically fused portion 11a is formed in the strip-form positive electrode substrate exposed portion 11 formed in the flattened electrode group 10, as shown in FIG. 1C.

Similarly, the anvil 22 is next deposed under a particular location in the strip-form negative electrode substrate exposed portion 12 formed on the flattened electrode group 10, and the ultrasonic horn 21 is deposed over that particular location in the negative electrode substrate exposed portion 12. Then a particular pressure is applied to the particular location in the negative electrode substrate exposed portion 12. After that, high-frequency waves are delivered from the control unit (not shown in the drawings) to the ultrasonic vibrator, causing the ultrasonic horn 21 to vibrate ultrasonically. Thereby, the negative electrode substrates at the particular position in the negative electrode substrate exposed portion 12 are ultrasonically fused. Next, the positions of the ultrasonic horn 21 and anvil 22 are moved, and ultrasonic fusing is repeated in the same way as above. Thereby, an ultrasonically fused portion 12a is formed in the strip-form negative electrode substrate exposed portion 12 formed in the flattened electrode group 10, as shown in FIG. 1C.

2. Flattened Electrode Body

After that, a positive electrode collector (of thickness 1 mm) 33 made of aluminum and having protuberances 33b, 33b on either side of the lower portion of an oblong main body 33a is prepared, and also a negative electrode collector (of thickness 1 mm) 34 made of nickel-plated copper and having protuberances 34b, 34b on either side of the lower portion of an oblong main body 34a is prepared. A slit 33c is formed in one protuberance 33b of the positive electrode collector 33, and a slit 34c is formed in one protuberance 34b of the positive electrode collector 34.

Next, with the main body 33a of the positive electrode collector 33 pressed against the edge of the ultrasonically fused portion 11a of the positive electrode substrate exposed portion 11 at one end of the flattened electrode group 10, the protuberances 33b, 33b are bent and pressured onto the two faces of the ultrasonically fused portion 11a. Also, with the main body 34a of the negative electrode collector 34 pressed against the edge of the ultrasonically fused portion 12a of the negative electrode substrate exposed portion 12 at the other end of the flattened electrode group 10, the protuberances 34b, 34b are bent and pressured onto the two faces of the ultrasonically fused portion 12a.

After that, a laser beam is shone from a laser welding machine, not shown in the drawings, along the lengthwise centerline of the slit 33c formed in one protuberance 33b of the positive electrode collector 33, laser-welding the protuberance 33b to the ultrasonically fused portion 11a of the positive electrode substrate exposed portion 11. Thereby, a laser weld 33d is formed in the location of the slit 33c that had been formed in the protuberance 33b. Also, a laser beam is shone from a laser welding machine, not shown in the drawings, along the lengthwise centerline of the slit 34c formed in one protuberance 34b of the negative electrode collector 34, laser-welding the protuberance 34b to the ultrasonically fused portion 12a of the negative electrode substrate exposed portion 12. Thereby, a laser weld 34d is formed in the location of the slit 34c that had been formed in the protuberance 34b.

Next there is prepared a sealing plate 35 that has a positive electrode terminal part 35a and a negative electrode terminal part 35b, and that also has a pour hole and gas vent valve (not shown in the drawings). Then the top edge portion of the main body 33a of the positive electrode collector 33 is bent and welded to the bottom edge portion of the positive electrode terminal part 35a, and the top edge portion of the main body 34a of the negative electrode collector 34 is bent and welded to the bottom edge portion of the negative electrode terminal part 35b. Thereby, a flattened electrode body 30 is formed in which a sealing plate 35 is disposed at the top of the flattened electrode group 10. The positive electrode terminal part 35a is insulated from the sealing plate 35 by a resin insulator 35c positioned therebetween, and likewise the negative electrode terminal part 35b is insulated from the sealing plate 35 by a resin insulator 35d positioned therebetween.

Next, the periphery of the flattened electrode body 30 with the sealing plate 35 disposed over the top thereof is sheathed by means of an insulating rim 36 whose cross-sectional shape and outer shape are both an angled "U" shape. Thereby, the positive electrode substrate exposed portion 11 and positive electrode collector 33, together with the negative electrode substrate exposed portion 12 and negative electrode collector 34, are sheathed by the insulating rim 36 having angled "U" shaped cross-sectional and outer shapes, so that the peripheral parts of the flattened electrode body 30 are insulated and protected by the insulating rim 36.

Next, a prismatic case 40 made of aluminum is prepared, and the flattened electrode body 30, with the peripheral parts thereof protected by the insulating rim 36, is inserted through the mouth of the case 40. After that, the contacting portions of the case 40 and sealing plate 35 are welded to effect sealing, then nonaqueous electrolyte (in the present instance, a mixture of ethylene carbonate (EC) and diethyl carbonate (DEC) in the ratio of 3:7 by volume, into which $LiPF_6$ is dissolved in the proportion 1 mole per liter) is poured in through the pour hole formed in the sealing plate 35. Next, the pour hole is sealed with a plug. Thereupon, manufacture of the prismatic nonaqueous electrolyte secondary battery is complete.

3. Examination of Welding Energy

Calculations were made of the welding energy for ultrasonically fusing the two substrate exposed portions 11 and 12 of the flattened electrode group to form the flattened electrode body 30, and of the welding energy for laser-welding the collectors 33 and 34 to the two ultrasonically fused portions 11a, 12a respectively of the flattened electrode body 30, when a prismatic nonaqueous electrolyte secondary battery is manufactured in the manner described above. It was calculated that the energy for the ultrasonic fusing to form the ultrasonically fused portions 11a and 12a, by pressing the ultrasonic horn 21 against the substrate exposed portions 11, 12 of the flattened electrode group 10 (in which a positive electrode substrate exposed portion 11 has been formed at one end and a negative electrode substrate exposed portion 12 at the other end) so that the layers of the substrate exposed portion 11 or 12 of each electrode polarity are fused together, as shown in FIG. 1, is 300 J and 600 J respectively. The amplitude of the ultrasonic waves was assumed to be 55 μm and 60 μm respectively.

Further, with the main body 33a of the positive electrode collector 33 pressed against the positive electrode substrate exposed portion 11 of the flattened electrode group 10, the protuberances 33b were bent and pressured onto the two faces of the positive electrode substrate exposed portion 11, and in that state the ultrasonic horn 21 was pressed against the protuberances 33b, so as to ultrasonically fuse together the layers of the positive electrode substrate exposed portion 11, and furthermore to ultrasonically fuse the protuberances 33b of the positive collector 33 to the positive electrode substrate exposed portion 11. Also, with the main body 34a of the negative electrode collector 34 pressed against the negative electrode substrate exposed portion 12 of the flattened electrode group 10, the protuberances 34b were bent and pressured onto the two faces of the negative electrode substrate exposed portion 12, and in that state the ultrasonic horn 21 was pressed against the protuberances 34b, so as to ultrasonically fuse together the layers of the negative electrode substrate exposed portion 12, and furthermore to ultrasonically fuse the protuberances 34b of the negative collector 34 to the negative electrode substrate exposed portion 12. It was calculated that the energy for the ultrasonic fusing in these cases was 600 J and 1000 J. The amplitude of the ultrasonic waves was assumed to be 55 μm and 60 μm respectively. These results are set forth in Table 1.

TABLE 1

| Location of ultrasonic fusing | Amplitude of ultrasonic waves (positive electrode) | Ultrasonic fusing energy (positive electrode) | Amplitude of ultrasonic waves (negative electrode) | Ultrasonic fusing energy (negative electrode) |
|---|---|---|---|---|
| Substrate exposed portions | 55 μm | 300 J | 60 μm | 600 J |
| Substrate exposed portions + collector | 55 μm | 300 J | 60 μm | 1000 J |

As is evident from the results in Table 1 above, compared to the case where the layers of each substrate exposed portion 11, 12 are ultrasonically fused and also the collectors 33 and 34 are ultrasonically fused thereto, ultrasonic fusing of only the layers of each substrate exposed portion 11 and 12 will enable a drastic reduction in ultrasonic fusing energy.

Next, with the main body 33a of the positive electrode collector 33 pressed against the positive electrode substrate exposed portion 11 of the flattened electrode group 10, but without an ultrasonically fused portion having been formed therein, the protuberances 33b were bent and pressured onto the two faces of the positive electrode substrate exposed portion 11. Similarly, with the main body 34a of the negative electrode collector 34 pressed against the negative electrode substrate exposed portion 12 of the flattened electrode group 10, but without an ultrasonically fused portion having been formed therein, the protuberances 34b were bent and pressured onto the two faces of the negative electrode substrate exposed portion 12.

In such state, a laser beam was shone along the lengthwise centerline of the slit 33c formed in a protuberance 33b, forming a laser-welded portion 33d in the location of the slit 33c, and then a laser beam was shone along the lengthwise centerline of the slit 34c formed in a protuberance 34b, forming a laser-welded portion 34d in the location of the slit 34c. The welding condition at this point was one where the slit 33c or 34c of the collector 33 or 34 had fused with all the layers of the substrate exposed portion 11 or 12. The irradiation energy of the laser in this process was determined, and taken as 100%.

Further, using the flattened electrode group 10 with ultrasonically fused portions 11a, 11b formed at the substrate exposed portions 11, 12, and the positive electrode collector 33 and negative electrode collector 34, the protuberances 33b, 33b of the positive electrode collector 33 were pressured onto the two faces of the positive electrode substrate exposed portion 11, and the protuberances 34b, 34b of the negative electrode collector 34 were pressured onto the two faces of the negative electrode substrate exposed portion 12, as shown in FIG. 2. After that, a laser beam was shone along the lengthwise centerline of the slit 33c formed in one of the protuberances 33b of the positive electrode collector 33, forming a laser-welded portion 33d in the location of the slit 33c.

Then a laser beam was shone along the lengthwise centerline of the slit 34c formed in one of the protuberances 34b of the negative electrode collector 34, forming a laser-welded portion 34d in the location of the slit 34c. The irradiation energy of the laser light was adjusted so that one item was produced by irradiation with 75% of the laser light used to simultaneously laser weld the substrate exposed portions and the collectors (a 25% reduction), and another item by irradiation with 50% of such laser light (a 50% reduction). When the resistance values (Ω) between the substrate exposed portions and the collectors were subsequently calculated, the results given in Table 2 below were obtained.

TABLE 2

| Collector welding conditions | Resistance value between positive electrode substrate exposed portion and positive electrode collector end portion | Resistance value between negative electrode substrate exposed portion and negative electrode collector end portion |
|---|---|---|
| Welding with laser reduced 25% after ultrasonic fusing of substrate exposed portions | 0.341 (mΩ) | 0.200 (mΩ) |
| Welding with laser reduced 50% after ultrasonic fusing of substrate exposed portions | 0.343 (mΩ) | 0.205 (mΩ) |
| Simultaneous welding of substrate exposed portions and collectors with 100% laser | 0.334 (mΩ) | 0.199 (mΩ) |

As is evident from Table 2 above, whether the collectors 33, 34 are welded at 25% or 50% reduced laser energy to ultrasonically fused portions 11a, 12a formed after the substrate exposed portions 11, 12 have been ultrasonically fused, or whether the collectors 33, 34 are welded simultaneously at 100% laser energy to the substrate exposed portions 11, 12, the resistance value between the positive electrode substrate exposed portion 11 and the end portion of the positive electrode collector 33, and the resistance value between the negative electrode substrate exposed portion 12 and the end portion of the negative electrode collector 34, are virtually equivalent, low resistances.

More precisely, by ultrasonically fusing the layers of each substrate exposed portion 11 and 12 in advance to form ultrasonically fused portions 11a and 12a, it becomes possible to use less laser energy when laser-welding the collectors 33, 34 to the ultrasonically fused portions 11a, 12a, and hence the laser energy can be reduced. Although ultrasonic energy is consumed beforehand in order to form the ultrasonically fused portions 11a, 12a, such ultrasonic energy is less than 50% of the laser energy, so that the total welding energy is reduced.

Thus, low-output laser welding is enabled, thanks to which it is possible to shorten the duration (takt time) of the welding process, and to reduce the equipment costs. Also, exertion of thermal effects on the separator and other parts present in the proximity of the welds can be prevented, and moreover no welding spatter will occur, so that the trouble of welding dust adhering to the electrode body or the processing equipment interior will not arise. As a result, a sealed battery of high quality and enhanced reliability can be provided.

Although the embodiment described above is an example where the invention is applied to a nonaqueous electrolyte secondary battery, it is obvious that the invention is not limited to nonaqueous electrolyte secondary batteries, but can be applied to alkali or other storage batteries including nickel-hydrogen storage batteries, nickel-cadmium storage batteries and so forth, provided that such are sealed batteries in which a metal case houses an electrode group that has a positive electrode exposed portion formed at one end and a negative electrode exposed portion formed at the other end.

Also, although the foregoing embodiment describes an example where a prismatic case is used, there is no particular restriction on the shape of the case, and it will be just as possible to use a cylindrical case. It will however be preferable to use a prismatically shaped case in the interest of efficient use of the space of the equipment in which the battery is installed. With a prismatically shaped case, the shape need not be strictly rectangular or cubic, but could have curved surfaces or tapers at the angles, and furthermore the cross-sectional shape in the height direction of the case could be oval instead of right-angled.

Moreover, although the foregoing embodiment describes an example where the electrode group used is a spiral electrode group that has been crushed into a flattened electrode group, it is obvious that other electrode groups, such as a plate-form one constituted of positive and negative electrode plates stacked with separators interposed, could be used.

What is claimed is:

1. A method for manufacturing a sealed battery in which a metal case houses an electrode group that has a positive electrode substrate exposed portion formed at one end and a negative electrode substrate exposed portion formed at the other end, the method comprising:
   ultrasonically fusing the positive electrode substrate exposed portion layers to form a positive electrode fused portion at the positive electrode substrate exposed portion, together with ultrasonically fusing the negative electrode substrate exposed portion layers to form a negative electrode fused portion at the negative electrode substrate exposed portion; and
   directing a high-energy beam at the positive electrode fused portion to weld a positive electrode collector to the positive electrode fused portion, together with directing a high-energy beam at the negative electrode fused portion to weld a negative electrode collector to the negative electrode fused portion, thus forming an electrode body in which the positive electrode collector is welded to one end of the electrode group and the negative electrode collector is welded to the other end, wherein the step of ultrasonically fusing is performed in advance of the step of directing the high-energy beam;
   the electrode body thus formed being placed inside a metal case together with electrolyte, and sealed,
   wherein each of the positive electrode collector and the negative electrode collector is formed parallel to a surface of stacked substrate exposed portion respectively and has a portion defining a slit formed on an outermost surface parallel to the surface of respective stacked substrate exposed portions, and the each slit of the positive electrode collector and the negative electrode collector is fused by high-energy beam with the substrate exposed portion.

2. The method for manufacturing a sealed battery according to claim 1, wherein the high-energy beam is a laser beam.

3. The method for manufacturing a sealed battery according to claim 1, the method comprising:
   bending side protuberances of the positive electrode collector onto two outermost surfaces parallel to the surface of the stacked substrate exposed portions forming said positive electrode fused portion at said one end of the electrode group, together with bending side protuberances of the negative electrode collector onto two outermost surfaces parallel to the surface of the stacked substrate exposed portions forming said negative electrode fused portion at said other end of the electrode group; and
   directing the high-energy beam on at least one of the side protuberances of said positive electrode collector to weld said positive electrode collector to the positive electrode fused portion, together with directing the high-energy beam on at least one of the side protuberances of said negative electrode collector to weld said negative electrode collector to the negative electrode fused portion.

4. The method for manufacturing a sealed battery according to claim 3, in which said side protuberances of the positive and negative electrode collectors are formed with the slits, and the slits and said positive/negative electrode substrate exposed portions are welded.

* * * * *